United States Patent Office 3,020,887
Patented Feb. 13, 1962

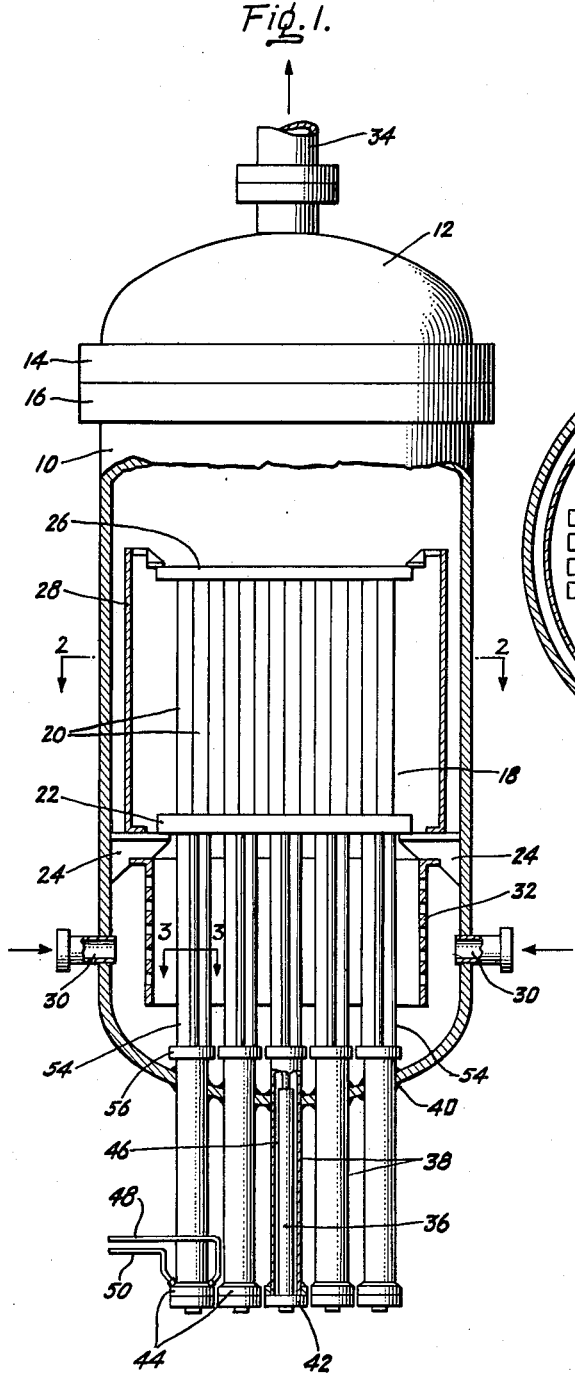
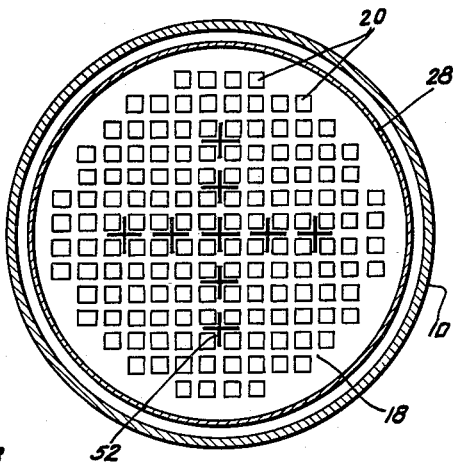
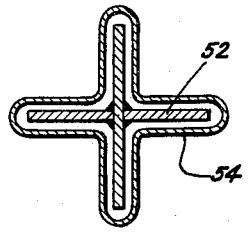

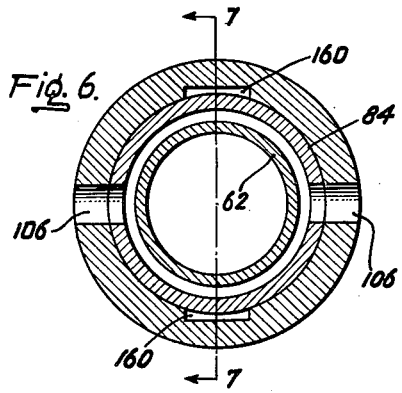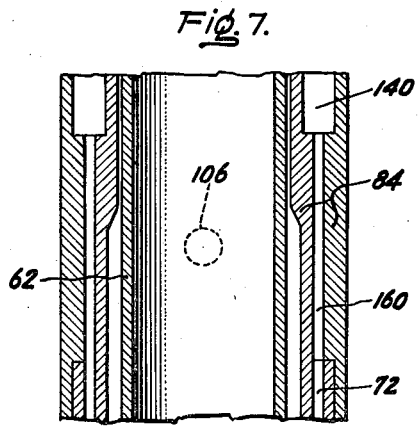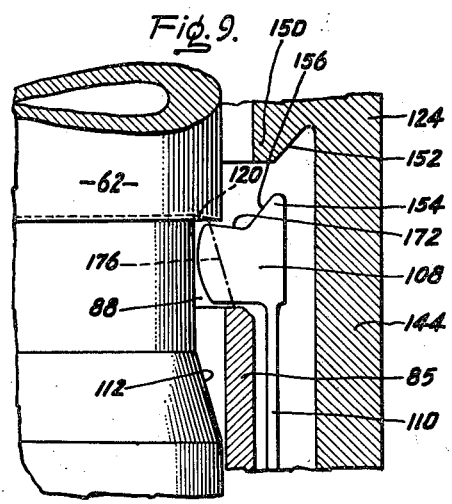

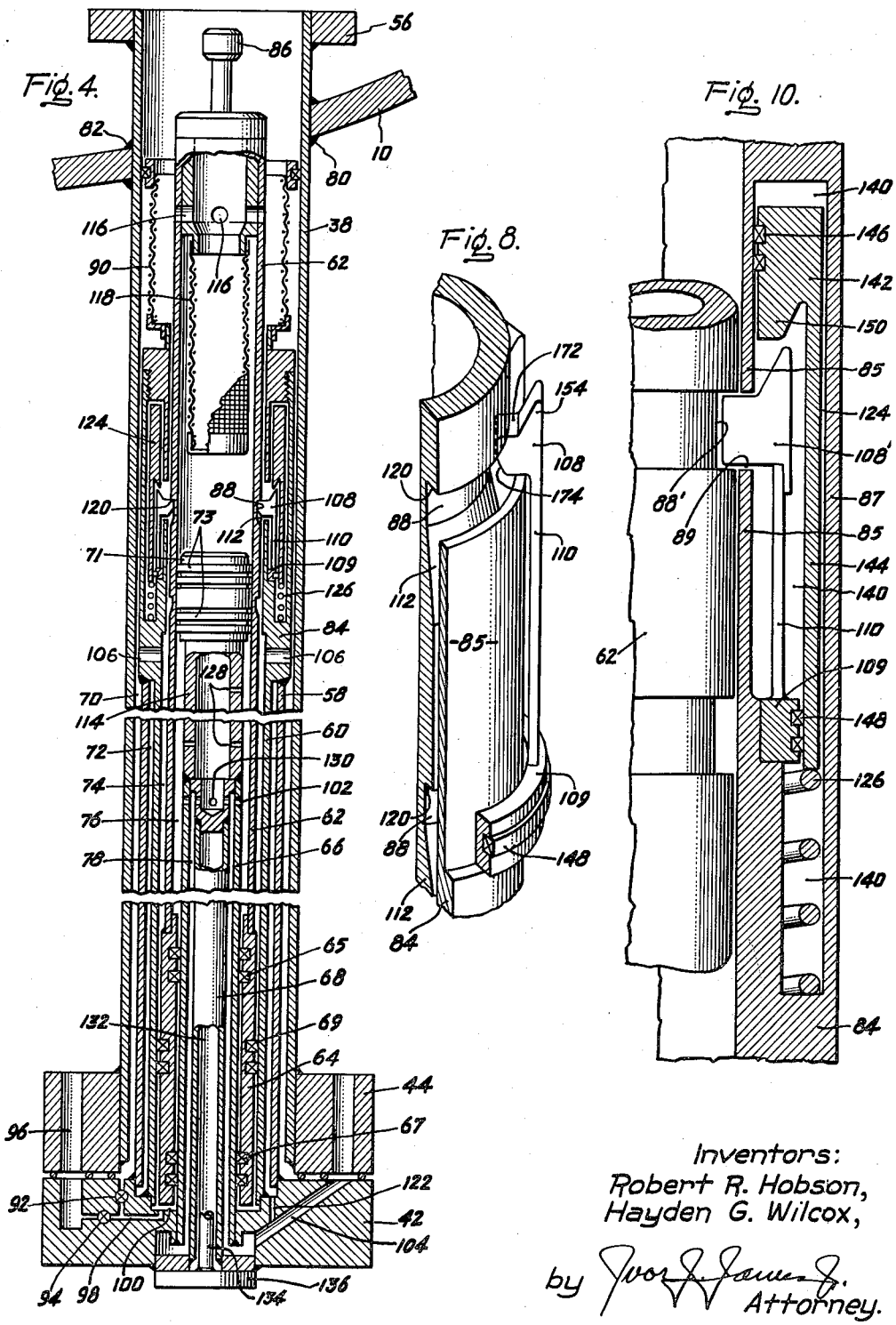

3,020,887
LINEAR MOTION-PRODUCING DEVICE AND IMPROVED LOCKING MEANS THEREFOR
Robert R. Hobson and Hayden G. Wilcox, San Jose, Calif., assignors to General Electric Company, a corporation of New York
Filed July 1, 1959, Ser. No. 824,246
16 Claims. (Cl. 121—40)

This invention relates to fluid-actuated linear motion-producing devices, and it more particularly relates to such devices provided with a particular locking means which functions to prevent the generation of linear motion in the absence of the application of a fluid pressure signal to the device.

Such linear motion-producing devices as herein described are useful in a wide variety of applications where controlled linear movement of an object is needed. For example, such devices may be used in machine tools, jacks, hoists, and in linear actuators in general. Such devices may also be used in the remote positioning of objects within an enclosure maintained under non-atmospheric conditions of temperature and pressure. For example, one such application is in the positioning of a nuclear reactor control element in the chain-reacting assembly or core of a nuclear reactor to vary the neutron flux and power levels. For purposes of illustration, the present invention is described in this latter context, although it should be understood that this is not a limitation on the utility of the invention. The invention can be readily applied by those skilled in the art in the field of linear motion devices generally.

The release of large amounts of energy through nuclear fission reactions is now well known. In general, a fissionable atom, such as $U^{233}$, $U^{235}$, $Pu^{239}$, or $Pu^{241}$ absorbs a neutron in its nucleus and undergoes a nuclear disintegration. This produces on the average two fission products of lower atomic weight and great kinetic energy, and usually two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electric volts) per fission.

Fission neutrons thus produced diffuse through the nuclear chain-reacting assembly and are either used or lost by several distinct competing mechanisms. Some neutrons migrate to the boundary of the chain-reacting assembly and escape or are lost from the system. Other neutrons undergo non-fission or radiative capture in the nuclear fuel atoms. Still other neutrons will undergo fission capture in the fuel atoms and, for example, fast neutrons are thus captured in $U^{235}$ or $U^{238}$ and thermal neutrons are captured in $U^{235}$. Still other neutrons undergo parasitic capture in the atoms of various extraneous or non-fissionable portions of the chain-reacting assembly, such as in the moderator coolant, various structural materials necessarily present, fission products, as well as in the nuclear reaction control elements.

The balance between the neutron production by fission and these various mechanisms competing for neutron utilization determine whether or not over any given time interval, the fission reaction is self-sustaining, decreasing, or increasing. When the reaction is self-sustaining, the neutron multiplication factor ($k_{eff}$) or the ratio of neutrons produced to those consumed or lost, equals 1.00. On the average, there is one neutron remaining from each fission event to induce a subsequent fission. Heat generation is thus continuous and it may be maintained so long as sufficient fissionable material is present in the system to override the effects of fission products, some of which are nuclear reaction poisons, which will be produced during operation. The heat generated in the system may be removed by passing a coolant through heat exchange relationship with the nuclear fuel in the chain-reacting assembly and it may be used to produce heat or mechanical or electrical power.

The neutron balance, and therefore the neutron population and the power level in the chain-reacting assembly, are variable by variation in the extent to which neutrons are consumed or wasted in non-fission capture in the control elements. This consumption of neutrons is in turn variable with the relative amount of control element material in the chain-reacting assembly at a given time. Control elements are conventionally removable from and insertable into the chain-reacting assembly by means of a suitable linear motion-producing device provided to move the control element and thus control the operation of the reactor. Such control elements contain materials whose atoms have very high non-fission neutron capture cross-sections. Some common materials are elemental or compound form of boron, cadmium, gadolinium, europium, erbium, samarium, hafnium, dysprosium, silver, and mercury.

In the nuclear reactor application, and in any other application involving remote positioning of an element within an enclosure maintained under non-atmospheric conditions, a connecting element usually must pass and be freely movable through a fluid-tight seal at the enclosure wall. Such seals are invariably subject to wear, and such wear or partial failure produces undesirable fluid leakage. Furthermore, in these mechanisms, a control signal frequently must be maintained on the device at all times to maintain a fixed position of the control element. Any variation or failure of this control signal results in an undesirable change in position of the element. Other problems include seizing and galling of parts in sliding contact with one another, particularly where coefficients of friction may approach 1.0.

One object of this invention is to provide a device which overcomes the above-mentioned problems.

Another object is to provide a fluid-actuated linear motion-producing device with an improved locking means.

It is another object of this invention to provide an improved locking device for a linear motion-producing device which does not depend upon friction effects for proper operation.

Another object of this invention is to provide an improved linear motion-producing device having either a bidirectional or a unidirectional locking mechanism which prevents linear motion from occurring either in both directions of one direction in the absence of a fluid pressure unlocking signal.

Other objects and advantages of this invention will become apparent to those skilled in the art as the illustration and description of several embodiments thereof proceed.

Briefly, the present invention comprises an improved locking device or apparatus for a reciprocable element, having at least one peripheral groove, including a hollow double-walled stationary member having an unlocking annulus therein and disposed coaxially with respect to the reciprocable element, one wall of said double-walled element having at least one locking aperture therein providing a bearing surface, a collar supported against said wall in said annulus, at least one spring finger extending longitudinally from said collar through said annulus to a point adjacent said locking aperture, a locking block secured at the end of said finger and normally biased thereby through said locking aperture into contact with the adjacent surface of said reciprocable element to engage the peripheral groove thereof whereby a load tending to move said reciprocable element relative to said stationary member is transmitted through a short moment arm in said locking block between the lock surface in said groove and the bearing surface in said aperture, an unlocking piston disposed in said unlocking annulus and adapted to engage said locking block to move it out of engagement with the peripheral groove, a loading spring in said annulus biasing said unlocking piston out of engagement with said locking block, and means for controllably introducing a fluid under pressure into said annulus to move said piston against said loading spring.

The present invention also comprises an improved linear motion-producing device including an inner and outer tubular element disposed coaxially with respect to one another, an annular driving piston and a connecting tube secured thereto reciprocably movable between the inner and outer tubular elements, and a fluid-actuated locking means briefly described above which functions to lock the connecting tube to a stationary part of the device. The locking means may be bidirectional, preventing motion in either direction without the unlocking signal. It may also be unidirectional in that it permits movement of the connecting tube in one direction without an unlocking signal and prevents reverse movement unless such a signal is applied.

The structure and the operation of the device of the present invention will be more readily understood by reference to the accompanying drawings in which:

FIGURE 1 is an elevation view in partial cross-section showing the device of this invention applied in the movement of nuclear reaction control elements in a nuclear chain-reacting assembly or core;

FIGURE 2 is a transverse cross-section view taken through the core shown in FIGURE 1;

FIGURE 3 is an enlarged tranverse cross-section view of the cruciform control elements shown in FIGURE 2;

FIGURE 4 is a longitudinal cross-section view of one embodiment of this invention provided with the improved unidirectional locking device shown in the locked position;

FIGURE 5 is an enlarged longitudinal cross-section view of the locking device hsown in FIGURE 4 which is here shown in the unlocked position;

FIGURE 6 is a transverse cross-section view of the device taken in the direction shown in FIGURE 5 to illustrate internal port means for transmitting the fluid unlocking signal into the unlocking annulus of the locking device shown in FIGURE 5;

FIGURE 7 shows a longitudinal cross-section view of the device of this invention turned 90 degrees from the view in FIGURE 5 and showing the internal port means indicated in FIGURE 6;

FIGURE 8 is a partial isometric view showing the cooperative relation between the peripheral groove, the locking blocks, and the inner wall of the double-walled stationary parts of the lock;

FIGURE 9 is an enlarged cross-section view of the elements shown in FIGURE 8, and in addition the unlocking member or piston is shown; and FIGURE 10 is an enlarged cross-section view of the bidirectional lock of this invention.

Referring particularly to FIGURE 1, a reactor pressure vessel 10 provided with removable head 12 is connected together by means of head flanges 14 and 16. A nuclear chain-reacting assembly or core 18, made up of a plurality of vertically disposed nuclear fuel-containing coolant flow channels 20, is supported within vessel 10 by means of lower core support plate 22 which in turn is supported by support means 24 in vessel 10. Upper core grid guide 26 is provided to secure the upper ends of channels 20 and maintain the relative spacing therebetween. A thermal shield 28 surrounds the reactor core 18 and is spaced inwardly from the inner surface of pressure vessel 10. The thermal shield is supported from support means 24 and functions to attenuate the intense gamma radiation emitted by the core and to minimize gamma heating of the pressure vessel wall.

The upper and lower ends of channels 20 are open to coolant flow, the coolant being introduced through inlet openings 30 into vessel 10. The coolant flows through a perforate cylindrical coolant diffusion basket 32, and then upwardly through flow channels 20. The heated coolant, which is partially vaporized in the case of a boiling reactor, for example, is removed through coolant outlet 34.

The linear motion-producing mechanism 36 of this invention, used to drive or position the control elements, is an integral unit contained in a thimble or pressure vessel extension 38 attached as by means of welds 40 to the bottom of pressure vessel 10. The control elements thus enter the reactor core from the bottom; they are withdrawn downwardly out of the core to start up and to raise the power level of the reactor, and are inserted upwardly into the reactor core to decrease the power level or shut the reactor down. The distribution of control elements in reactor core 18 and the cross-section of a typical control element are described in particular in connection with FIGURES 2 and 3.

The drive mechanism is a two-connection fluid-actuated apparatus with the ability to regulate the control element to any set position and to hold that position until it again receives a command signal to move. Scram, or a rapid reactor shutdown by rapid control element insertion, utilizes high-pressure fluid either from a separate fluid accumulator or from reactor vessel 10. In any set position, the control element is held fixed by means of the novel mechanical locking device of this invention, and is in no way dependent upon fluid sources.

The drive mechanism 36 consists of a long tube or jacket containing the operating mechanism, shown in greater detail in the subsequent figures, and terminating at its lower end n flange 42. This drive mechanism 36 is inserted into thimble 38 and is sealed by means of a metal O ring seal to thimble flange 44. The annular space or thimble annulus 46 between thimble 38 and drive mechanism container tube or jacket 36 communicates at its upper end with the fluids present in reactor vessel 10. These fluids at reactor vessel pressure can flow down to the drive mechanism 36 through this space. External control fluid sources are connected by means of two lines 48 and 50 to the thimble flange 44. These are internally ported for connection to the drive mechanism 36. The fluid may be either liquid or gaseous. Hereinafter in the description, it is assumed a hydraulic liquid.

In FIGURE 2 a transverse section of the device in FIGURE 1 is shown. Reactor core 18 is made up of a plurality of fuel-containing flow channels 20 and is surrounded by thermal shield 28, the whole being contained in reactor vessel 10. The flow channels are here shown as being square in cross-section, although other flow channels having circular, hexagonal, or other cross-sections may be employed. In this modification the square channels 20 are spared slightly apart from one another in a lattice having a square pitch. Cruciform control elements 52, which may conveniently be stainless steel containing 2 percent boron, are spaced throughout the lattice. These control elements are movable into and out of reactor core 18 by means of the drive mechanism described.

In FIGURE 3 is shown a cross-section view taken as indicated in FIGURE 1 of one of the cruciform control elements 52 which is contained in a guide tube 54, also of cruciform cross-section.

Referring again briefly to FIGURE 1, the control element guide tubes 54 are shown extending from core support plate 22 downwardly to upper flange 56 of each of the thimbles 38. The control elements 52 are withdrawn downwardly from reactor core 18 into these guide tubes 54.

In FIGURE 4 a longitudinal cross-section view of one embodiment of this invention is shown, including a unidirectional locking mechanism. The device of FIGURE 4, in which this invention is embodied, includes jacket 58, outer tube 60, connecting tube 62 provided with driving piston 64 at its lower end, inner tube 66, and position indicator tube 68 at successively smaller radii from the longitudinal centerline of the device. In the device shown, the tubular means are right circular cylinders; however, other tubular elements with other geometric cross-sections such as square, hexagonal, and the like may be substituted.

The concentric relationship of the elements specified provides a plurality of annuli therebetween used in this device for the transmission and displacement of hydraulic liquid into and out of the device during operation. These annuli include thimble annulus 70, jacket annulus 72, outer tube annulus 74, piston connecting tube annulus 76, and inner tube annulus 78.

As indicated, thimble 38 is secured at its upper end as by means of welds 80 and 82 to pressure vessel 10 and is provided at its lower end with thimble flange 44 to which the thimble is similarly secured. Jacket 58 and outer tube 60 are both secured at their lower ends to lower flange 42. They are joined at their upper end and provide support for double-walled extension 84 in which the locking device of this invention is disposed in an unlocking annulus. Inner tube 66 and position indicator tube 68 are integrally secured to one another at their upper ends, and are integrally secured at their lower ends to lower flange 42.

Driving piston 64 is provided at its upper and lower ends with inner piston rings 65 and 67 which contact and seal against the outer surface of inner tube 66. Driving piston 64 is further provided with outer piston rings 69 which contact and seal against the inner surface of outer tube 60. These seal rings permit the driving piston to drive piston 64 upwardly or downwardly depending upon the direction of the pressure differential applied. The upper ends of tube 66 and 68 are joined together and provided with extension tube 114 having a head 71 and a plurality of seal rings 73 sealing against the inner surface of connecting tube 62. Between these two inner and outer stationary tubular elements, piston 64 and connecting tube 62 are reciprocable.

The other end of connecting tube 62 is provided with spud 86 to which the object or load to be positioned is attached. In the context of this illustration, this object is a linearly reciprocable control element of a nuclear chain-reacting assembly as previously indicated. The outer surface of connecting tube 62 is provided with a plurality of peripheral locking grooves 88 of particular shape and which cooperate with the locking means of this invention to permit the drive mechanism to be locked securely in at least one and preferably a plurality of discrete positions. The detail of the locking device is more fully described and illustrated below. The device of FIGURE 4 is essentially a hydraulic piston actuator which is locked or latched in discrete positions. The unidirectional lock of this invention, as applied to the control of a nuclear reactor, prevents withdrawal of the control elements to produce increased reactivity unless the locking device is intentionally unlatched. The mechanism, however, is free to travel in the insert or decreased reactivity direction without the unlocking signal whenever the appropriate driving piston fluid is applied.

In FIGURE 4 the device is shown locked in its lowest position as the drawing is normally viewed; that is, the control element attached to spud 86 is fully withdrawn from the reactor. The device provides for two sources of fluid driving pressure which are operative to move piston 64 and connecting tube 62 upwardly or into the reactor. The first source is fluid pressure from within reactor vessel 10. Such fluid may flow through the upper open end of thimble 38, through filter screen 90 and downwardly through thimble annulus 70 to a pressure actuated three-way valve mechanism schematically shown in flange 42 as including valves 92 and 94. The second source is fluid pressure from an external accumulator supplied through flanges 44 and 42 by means of channel 96 which communicates with the three-way valve system. The three-way valve system communicates through channel 98 with chamber 100 immediately below driving piston 64. The three-way valve system 92 and 94 operates to deliver through channel 98 to chamber 100 fluid from either the separate accumulator or the reactor vessel, depending upon which is at the higher pressure. Thus if the accumulator pressure fails, the reactor fluids may be used to drive the control elements into the reactor to shut it down. Also in the event the vessel pressure rises to undesirably high levels, valve 92 will open and valve 94 will close automatically upon sensing this excessive pressure, driving piston 64 and connecting tube 62 upwardly, also shutting down the reactor.

The upward motion of piston 64 displaces fluids from connecting tube annulus 76 inwardly through openings 102 into inner tube annulus 78 from which they may flow outwardly through channel 104 indicated in flanges 42 and 44. Fluids displaced from outer tube annulus 74 are displaced through openings 106 into thimble annulus 70.

Groove 88 is asymmetrical in that it has at one end a lock surface 120 substantially at right angles to the outer surface of extension tube 62, and at the other end has a long chamfer or cam surface 112 bearing an acute angle to the outer surface. This acute angle may be between about 5 degrees and about 45 degrees. The unidirectional locking device of this invention includes locking blocks 108 which are normally biased inwardly into engagement with grooves 88 by cantilever spring fingers 110 extending longitudinally from collar 109. Blocks 108 are correspondingly asymmetrical and are cammed outwardly by direct contact with the lower long chamfer or cam surface 112 in groove 88 upon upward motion, but remain engaged in groove 88 if a load is applied to tube 62 tending to move it downward. The locking means of this embodiment of this invention is thus unidirectional, permitting free upward movement of connecting tube 62.

By reversing the positions of the lock and chamfer surfaces 112 and 120 and reversing the corresponding surfaces on locking blocks 108, the lock is unidirectional in the opposite direction.

The upward movement referred to above increases the volume within connecting tube 62 above the upper end of extension 114 of inner tube 66 and position indicator tube 68. To prevent the formation of a vacuum from restraining the upward motion, openings 116 are provided near the upper end of connecting tube 62 into which reactor vessel fluids may flow through inner screen 118.

To move the driving piston 64 and connecting tube 62 downwardly, the locking device must first be actuated and unlocked. When locked, the flat or slightly undercut upper lock surface 120 at the upper end of locking groove 88 contacts directly the corresponding upper lock surface of locking block 108 and prevents downward movement. The down driving hydraulic signal is applied from a separate accumulator through channel 104 in flanges 42 and 44, upwardly through inner tube annulus 78 to the upper end of the structure, outwardly through openings 102 into connecting tube annulus 76 which is sealed at its upper end, and downwardly through this annulus against the upper end of piston 64. Simultaneously, an unlocking piston signal is transmitted from channel 104 through channel 122 upwardly into jacket annulus 72 to the upper end thereof, and through a communicating channel, not shown here but indicated in FIGURES 6 and 7, into the double-walled extension 84 at the upper ends of jacket 58 and outer tube 60, and in which the unlocking piston 124 and the locking means are located. This signal moves unlocking piston 124 downwardly against its loading spring 126 as hereafter described in greater detail, thereby engaging the upper end of locking blocks 108 moving them outwardly out of locking grooves 88. This permits the downwardly acting hydraulic forces on driving piston 64 to move connecting tube 62 downwardly at a rate determined by the pressure differential and the rate of flow of hydraulic fluid in through channel 104.

In the nuclear reactor application, it is desirable to provide for the rapid insertion of the control elements into the reactor core in case of emergency. The movement in such case may be at high velocity required to move the control elements 10 or 12 feet in a matter of one or two seconds. To dissipate the kinetic energy of the moving equipment at the end of the structure, braking orifices 128 are provided in the wall of extension 114 just below head 71. During upward movement of connecting tube 62, the displaced fluids normally flow inwardly through openings 102. These openings are, however, placed such that upper seal rings 65 will pass over openings 102 a short distance before the end of the stroke, thus preventing flow of displaced fluids through these relatively large openings. The only remaining opening for displaced fluid flow is that provided by braking orifices 128 which, being superimposed one above the other, are progressively shut off by seal rings 65 during the remaining motion. The kinetic energy is dissipated through displacement of fluids through braking orifices 128 at high velocity and high pressure drop decelerating the mechanism to a gradual stop at the upper end of the structure. The fluids displaced through orifices 128 escape from extension 114 outwardly through openings 130 into inner tube annulus 78.

Position indicator tube 68 is provided with an internal opening 132 into which any suitable form of position indicator, preferably electrically operated, is inserted. Such a position indicator probe 134 provided with connecting flange 136 is indicated at the lower end of FIGURE 4.

In FIGURE 5 an enlarged longitudinal cross-section view of part of the device of FIGURE 4 details the various parts of the locking device. In this drawing, elements also illustrated in FIGURE 4 are indicated by the same numbers. Unlocking piston 124 operates in an unlocking chamber or annulus 140 contained in the double-walled extension 84 having inner wall 85 and outer wall 87. Piston 124 is provided with an upper portion 142 of relatively larger wall thickness than the lower portion 144. Upper and lower piston rings 146 and 148 are provided riding against the outer surface of the inner wall 85. At the point of connection of the upper and lower portions 142 and 144, unlocking piston 124 is provided with spur 150 having a surface 152 which projects downwardly and inwardly into engagement with a corresponding but outwardly projecting spur 154 at the upper end of locking block 108. Spur 154 has an upper surface which projects outwardly and upwardly and is engageable with the corresponding surface of spur 150.

As indicated in connection with FIGURE 4, an unlocking hydraulic signal is transmitted through jacket annulus 72. Jacket annulus 72 communicates with unlocking annulus 140 by means of at least one internal port 160 in jacket and outer tube extension 84. It is shown more clearly in FIGURES 6 and 7.

The unlocking signal pressure thus introduced into unlocking annulus 140 applies a net downwardly acting pressure differential across locking piston 124 due to the fact that the cross-sectional area of upper portion 142 is larger than that of lower portion 144. This piston is moved downwardly from the position shown in FIGURE 4 into the position shown in FIGURE 5 against the upwardly acting force of loading spring 126 which normally biases it out of engagement with locking blocks 108. In this unlocked position, spurs 150 and 154 are engaged, the locking blocks 108 are moved radially outwardly out of engagement with locking grooves 88 and through aperture 89 in the inner wall 85. The connecting tube 62 is thus free to move downwardly. The downward movement is terminated upon the termination of the downwardly acting pressure differential on the driving piston and the unlocking piston. Loading spring 126 moves locking piston 124 upwardly disengaging it from locking blocks 108 which return to their normal or locked position against the outer surface of connecting tube 62. Due to the continued motion of connecting tube 62, primarily because of gravity, locking blocks will engage with the next adjacent locking groove 88 which appears opposite locking aperture 89 and the locking blocks.

In FIGURES 6 and 7, transverse and longitudinal cross-section views of jacket and outer tube extension 84 are shown. These views indicate the direct communication through internal port 160 between jacket annulus 72 and unlocking annulus 140. Two such ports are shown in a longitudinal plane rotated 90 degrees from the ports 106.

Connecting tube 62 is provided with a plurality of longitudinally spaced notches or grooves 88 into which locking blocks 108 are positioned by a cantilever spring finger 110. Static loads on the connecting tube 62 act in the downward direction out of the reactor core as FIGURE 4 is normally viewed with the device in the locked position. The load is transmitted from the upper lock surface of groove 88, through the locking blocks 108, to the bearing surface of aperture in the inner wall 85 of extension 84.

When connecting tube 62 is moved in the "in" direction, or upwardly as FIGURES 4 and 5 are normally viewed, locking blocks 108 are "cammed" outwardly into the position shown in FIGURE 5 by the long chamfer or cam portion of groove 88 against the inwardly acting spring force exerted by fingers 110. Connecting tube 62 is thus able to move freely in the upward direction causing a "ratchet" action between grooves 88 and locking blocks 108, but the device will be locked at the first groove 88 encountered by locking blocks 108 when moving in the "out" or downward direction.

When it is desired to move connecting tube 62 out of the reactor core or downwardly, as FIGURE 5 is normally viewed, connecting tube 62 may first be moved in or upwardly to force locking blocks 108 back or outwardly as described. Unlocking piston 142 is then supplied with an unlocking signal and moved downwardly to engage the respective spurs 150 and 154, thus holding locking blocks 108 out of groove 88 so that they will not re-engage. Connecting tube 62 can then move freely downwardly as long as unlocking piston 124 holds the position indicated in FIGURE 5. Locking blocks 108 are released upon termination of the unlocking pressure signal thereby returning unlocking piston 124 through the action of loading spring 126 to its position shown in FIGURE 4, locking blocks 108 being restored to their normal position through the inward acting force of spring fingers 110 to engage the next groove 88.

Locking blocks 108 resist the downward load forces impressed upon them, when the device is in the locked position as indicated in FIGURE 4, by means of rotational forces of short moment arm and low angular displacement from the longitudinal axis of the force application acting through loading blocks 108 from the flat surface of groove 88 to a surface of the aperture in inner wall 85 of extension 84. Forces on connecting tube 62 in the opposite or upward direction are not resisted by locking blocks 108 due to the cam surface of grooves 88 and the effective rotation of locking blocks 108 out of the locked position through a long radius about a point at the base of spring fingers 110. In addition, locking blocks 108 are clear of the supporting surface at the upper end of the inner portion 85 of extension 84 in the unlocked or unloaded condition so that there is no sliding contact between the lower surface of locking blocks 108 and the locking apertures in extension 84.

In FIGURE 8 is an enlarged partial isometric view showing the device of this invention in the locked position. Again elements shown in the previous drawings are here designated by the same numbers. Locking blocks 108 are shown positioned above collar 109 at the upper end of spring fingers 110 which normally bias the blocks into the position shown. The spring fingers are supported at their lower ends by means of a collar 170 in which one of lower locking piston seal rings 148 is shown. Locking blocks 108 are asymmetrical, provided with upper spur 154, an upper flat or undercut locking surface 172 which projects into engagement with the upper lock surface 120 of groove 88, and with a lower curving cam surface 174 which engages and readily rides outwardly on lower cam surface 112 of locking groove 88.

In FIGURE 9 an enlarged side view of the lock of this invention is shown in the locked position. Again, corresponding elements are designated by the same numbers given previously. The short moment and the lower angular deviation of the load transmission path from the longitudinal direction of motion from surface 120 through locking blocks 108 to the bearing surface in the aperture in inner wall 85 is apparent. The device is shown in the locked position with the load from surface 120 transmitted to inner wall 85 approximately along broken line 176. One specific example of an embodiment of this invention involves an unlocking piston whose downwardly projecting spur 150 has a inner surface 152 sloping at 45 degrees with respect to the inner surface of unlocking piston 124, and locking blocks 108 having upper spur 154 and inner surface 156 whose slope is 43 degrees with respect to the same inner surface.

In FIGURE 10 is shown another embodiment of this invention in which the locking device is bidirectional, that is, an unlocking signal is required to move it in either direction. Elements previously described are indicated here with the same numbers. Note that locking groove 88' is symmetrical, it has lock surfaces which are flat or slightly undercut and which are substantially at right angles to the outer surface of connecting tube 62 at each end. Locking block 108' has a correspondingly symmetrical shape to engage groove 88'. Inner wall 85 is provided with locking aperture 89 immediately adjacent locking block 108'. Loads in either direction on connecting tube 62 are thus transmitted through short moment arms in blocks 108' to inner wall 85. Activation of unlocking piston 124 to move blocks 108' out of engagement with groove 88' is required to move the device in either direction.

The following data are given as an example of the present invention applied to the remote positioning of control elements in a nuclear reactor which is moderated and cooled by boiling natural water at 1,000 p.s.i.a. and about 545° F. The reactor vessel is 12 feet inside diameter, 41.5 feet inside height, and has a wall thickness of 5.625 inches including an internal clad of type 304 stainless steel approximately 0.375 inch thick. The chain-reacting assembly or core consists of 488 nuclear fuel-containing flow channels approximately 10 feet long and of square cross-section approximately 4.5 inches on a side arranged to form a reactor core approximately the shape of a right circular cylinder fitting into a circumscribed circle 9.5 feet in diameter. Each flow channel or fuel assembly contains 36 fuel rods approximately 0.5 inch in diameter, spaced approximately 0.75 inch center to center, and arranged in a square 6 by 6 array. Each fuel rod contains sintered uranium dioxide ($UO_2$) fuel enriched to contain 1.5 atom percent of $U^{235}$. The fuel elements are clad in zirconium alloy tubing.

The individual fuel channels are spaced apart from one another approximately 0.75 inch adjacent the control elements and 0.375 inch apart elsewhere. Eighty control elements are positioned between the fuel channels and more or less uniformly disposed throughout the transverse cross-section of the core. The control elements have a cruciform cross-section of approximately 6.5 inches in width and 0.375 inch in thickness, and consist of stainless steel containing 2 percent by weight of natural boron. The control elements are approximately 9 feet long, and have a stroke of 8.5 feet.

By way of example, principal dimensions of a linear motion-producing device of this invention are given in the following table.

| Thimble: | Inches |
|---|---|
|     Outside radius | 2.375 |
|     Wall thickness | 0.375 |
| Jacket: | |
|     Outside radius | 1.75 |
|     Wall thickness | 0.134 |
| Outer tube: | |
|     Outside radius | 1.50 |
|     Wall thickness | 0.24 |
| Driving piston: | |
|     Outside radius | 1.22 |
|     Wall thickness | 0.43 |
| Connecting tube: | |
|     Outside radius | 1.12 |
|     Wall thickness | 0.18 |
| Inner tube: | |
|     Outside radius | 0.75 |
|     Wall thickness | 0.12 |
| Locking position: | |
|     Outside radius | 1.60 |
|     Wall thickness— | |
|         Lower portion | 0.12 |
|         Upper portion | 0.36 |
|     Length | 5.75 |
|     Travel | 0.25 |
| Collet lock collar: | |
|     Outside radius | 1.74 |
|     Thickness | 0.17 |
|     Height | 0.80 |
| Spring fingers: | |
|     Outside radius | 1.37 |
|     Radial thickness | 0.05 |
|     Width | 0.438 |
|     Length | 2.4 |
| Locking blocks: | |
|     Radial thickness | 0.34 |
|     Height | 0.25 |
|     Spur height | 0.17 |
|     Width | 0.438 |
|     Number, 6. | |

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a linear motion-producing apparatus which comprises stationary coaxial inner and outer tubular elements with an annular space therebetween, a double-acting driving piston reciprocably disposed in said annular space, a connecting tube secured to said driving piston and extending from said annular space for connection to a load, and means for introducing and removing actuating fluid to and from said annular space to move said driving piston and said connecting tube in either direction, the improved locking means which comprises, in combination with at least one peripheral groove providing a lock surface in the outer surface of said connecting tube at at least one position intermediate the ends of said tube, a collar supported adjacent one end of said outer tubular element, at least one spring finger extending longitudinally from said collar to a point adjacent a bearing surface on said outer tubular element, a locking block at the end of said fingers and normally biased thereby adjacent said bearing surface into contact with the outer surface of said connecting tube and adapted to engage said groove and transmit a load on said connecting tube through a very short moment arm from said lock surface through said locking block to said bearing surface thereby locking the connecting tube in a fixed position intermediate the extreme positions of connecting tube travel, and means for moving said block out of said peripheral groove to unlock said connecting tube from said outer tubular element.

2. In a linear motion-producing apparatus which comprises stationary coaxial inner and outer tubular elements with an annular space therebetween, a driving piston reciprocably disposed in said annular space, a connecting tube secured to said driving piston and extending from said annular space for connection to a load, and means for introducing and removing actuating fluid to and from said annular space to move said driving piston and said connecting tube, the improved locking means which comprises, in combination with at least one peripheral groove providing a lock surface in the outer surface of said connecting tube, a collar supported adjacent one end of said outer tubular element, a plurality of spring fingers extending longitudinally from said collar to a point adjacent a bearing surface on said outer tubular element, a locking block at the end of each of said fingers and normally biased thereby adjacent said bearing surface into contact with the outer surface of said connecting tube and adapted to engage said groove and transmit a load on said connecting tube through a very short moment arm from said lock surface through said locking blocks to said bearing surface thereby locking the connecting tube in a fixed position, and means for moving said blocks out of said peripheral groove to unlock said connecting tube from said outer tubular element.

3. An apparatus according to claim 2 wherein said groove is asymmetrical in that it has at one end a lock surface substantially at right angles to the outer surface of said connecting tube and a cam surface at the other end making an acute angle with said outer surface whereby said locking means is unidirectional.

4. An apparatus according to claim 2 wherein said groove is symmetrical in that it has at each end lock surfaces substantially at right angles to the outer surface of said connecting tube whereby said locking means is bidirectional.

5. In a linear motion-producing apparatus which comprises stationary coaxial inner and outer tubular elements spaced apart from one another to provide an outer tube annulus therebetween, a driving piston reciprocably disposed in said annulus, a connecting tube secured at one end to said driving piston and extending from the output end of said annulus to the other end of said connecting tube for connection to a load, and means for introducing and removing actuating fluid from the ends of said annulus to move said driving piston and connecting tube, the improvement in combination with at least one peripheral groove in the outer surface of said connecting tube which comprises means for locking said connecting tube releasably to one of said stationary elements, which locking means comprises a stationary tubular jacket surrounding and spaced apart from said outer tubular element, a double-walled extension coaxially supported at one end to the ends of both said jacket and said outer tubular element and providing an unlocking annulus therein, the inner wall of said extension having at least one peripheral locking aperture therein providing a bearing surface, a collar supported around the inner wall of said extension, a plurality of spring fingers extending longitudinally from said collar through said unlocking annulus to points adjacent said locking aperture, a locking block secured at the end of each of said fingers and laterally aligned with and normally biased inwardly through said locking aperture into contact with the outer surface of said connecting tube to engage the peripheral groove, an unlocking piston disposed in said unlocking annulus and adapted to engage said locking blocks to move them out of engagement with said peripheral groove, and a loading spring biasing said unlocking piston out of engagement with said locking blocks, said unlocking annulus communicating with a controllable source of fluid pressure to move said unlocking piston against said loading spring.

6. An apparatus according to claim 5 wherein said spring fingers and locking blocks are distributed uniformly around the inner wall of said double-walled extension in said unlocking annulus.

7. An apparatus according to claim 5 wherein each locking block is provided with an outwardly projecting spur and said unlocking piston is provided with an inwardly projecting spur whereby the spur surfaces are engageable upon movement of said piston and deflect said blocks outwardly.

8. An apparatus according to claim 5 wherein said peripheral grooves are asymmetrical in that they have at one end a lock surface at substantially right angles to the outer surface of said connecting tube and have at the other end a long chamfer or cam surface bearing an acute angle to said outer surface, wherein said locking blocks are correspondingly asymmetrical having a lock surface at one end at substantially right angles to the outer surface of said connecting tube and having at its other end a cam surface of relatively long radius of curvature whereby said blocks are cammed out of engagement with said grooves upon contact with the cam surface of the peripheral grooves, the locking means being unidirectional in that movement of said connecting tube is permitted only in one direction in the absence of actuation of said unlocking piston.

9. An apparatus according to claim 5 wherein said peripheral grooves are symmetrical in that they are provided at each end with lock surfaces which are at substantially right angles to the outer surface of said connecting tube, wherein said locking blocks are correspondingly symmetrical having lock surfaces at each end substantially at right angles to said outer surface, whereby said locking means is bidirectional in that loads in either direction on said connecting tube are transmitted through short moment arms in said locking blocks to a bearing surface of the locking aperture in the inner wall of said extension.

10. An apparatus according to claim 5 wherein said unlocking piston disposed in said unlocking annulus is exposed at both ends to the same source of actuating pressure, is provided with sealing means against adjacent stationary surfaces of said unlocking annulus, and is provided with a wall thickness at one end which is substantially greater than that at the other end whereby a sufficient fluid pressure applied to both ends of said unlocking piston substantially simultaneously will cause said piston to move against said loading spring.

11. An improved locking apparatus for a double-acting connecting tube element reciprocably disposed between stationary coaxial inner and outer tubular elements which comprises, in combination with at least one peripheral groove forming a lock surface in the outer surface of said connecting tube element at at least one position intermediate the ends of said connecting tube element, a collar supported adjacent one end of said outer tubular element, at least one spring finger extending longitudinally from said collar to a point adjacent a bearing surface on said outer tubular element, a locking block at the end of said finger and normally biased adjacent said bearing surface into contact with the outer surface of said connecting tube element and adapted to engage said groove and transmit a load on said connecting tube through a very short moment arm from the lock surface through said locking block to said bearing surface thereby locking said connecting tube in a fixed position intermediate the extreme positions of connecting tube travel, and means for moving said block out of said peripheral groove to unlock said connecting tube from said outer element.

12. An improved locking apparatus for a connecting tube element reciprocably disposed between stationary coaxial inner and outer tubular elements which comprises, in combination with at least one peripheral groove forming a lock surface in the outer surface of said connecting tube element, a collar supported adjacent one end of said outer tubular element, a plurality of spring fingers extending longitudinally from said collar to a point adjacent a bearing surface on said outer tubular element, a locking block at the end of each of said fingers and normally biased adjacent said bearing surface into contact with the outer surface of said connecting tube element and adapted to engage said groove and transmit a load on said connecting tube through a very short moment arm from the lock surface through said locking block to said bearing surface thereby locking said connecting tube in a fixed position, and means for moving said blocks out of said peripheral groove to unlock said connecting tube from said outer element.

13. An improved locking apparatus for a peripherally grooved connecting tube element attached to a driving piston and mounted reciprocably between coaxial stationary inner and outer tubular elements, which locking device comprises a stationary tubular jacket surrounding and spaced apart from said outer tubular element, a double-walled extension coaxially supported at one end to the ends of both said jacket and said outer tubular element and providing an unlocking annulus therein, the inner wall of said extension having at least one peripheral locking aperture therein providing a bearing surface, a collar supported around the inner wall of said extension, a plurality of spring fingers extending longitudinally from said collar through said unlocking annulus to points adjacent said locking aperture, a locking block secured at the end of each finger and laterally aligned with and normally biased thereby inwardly through said locking aperture into contact with the outer surface of said connecting tube element to engage the peripheral grooves thereof, an unlocking piston disposed in said unlocking annulus and adapted to engage said locking blocks to move them out of engagement with said peripheral grooves, and a loading spring biasing said unlocking piston out of engagement with said unlocking blocks, said unlocking annulus communicating with a controllable source of fluid pressure to move said unlocking piston against said loading spring.

14. An apparatus according to claim 13 wherein said unlocking piston disposed in said unlocking annulus is exposed at both ends to the same source of actuating pressure, is provided with sealing means against adjacent stationary surfaces of said unlocking annulus, and is provided with a wall thickness at one end which is substantially greater than that at the other end whereby a sufficient fluid pressure applied to both ends of said unlocking piston substantially simultaneously will cause said piston to move against said loading spring.

15. An apparatus according to claim 13 wherein each locking block is provided with an outwardly projecting spur and said unlocking piston is provided with an inwardly projecting spur whereby the spur surfaces are engageable upon movement of said piston and deflect said blocks outwardly.

16. An improved locking apparatus for a reciprocable peripherally-grooved element which comprises a double-walled hollow stationary member having an unlocking annulus therein disposed coaxially with respect to said reciprocable element, one wall of said double-walled member having at least one locking aperture therein providing a bearing surface, a collar supported against said wall in said annulus, at least one spring finger extending longitudinally from said collar through said unlocking annulus to a point adjacent said locking aperture, a locking block secured at the end of said finger and laterally aligned with and normally biased thereby through said locking aperture into contact with the adjacent surface of said reciprocable element to engage the peripheral groove thereof whereby a load tending to move said reciprocable element relative to said stationary member is transmitted through a short moment arm in said locking block between the lock surface in said groove and said bearing surface in said aperture, an unlocking piston disposed in said unlocking annulus and sealed against an adjacent surface of said annulus and provided with a wall thickness at one end which is substantially greater than at the other end and adapted to engage said locking block to move it out of engagement with said peripheral groove, a loading spring in said annulus biasing said unlocking piston out of engagement with said locking block, and means for controllably introducing a fluid under pressure into said unlocking annulus to move said piston against said loading spring.

References Cited in the file of this patent

UNITED STATES PATENTS

| | | |
|---|---|---|
| 2,118,890 | Maes | May 31, 1938 |
| 2,771,060 | Allbright | Nov. 20, 1956 |
| 2,851,995 | Westcott | Sept. 16, 1958 |
| 2,896,583 | Stixrood | July 28, 1959 |

FOREIGN PATENTS

| | | |
|---|---|---|
| 581,833 | Great Britain | Oct. 25, 1946 |